United States Patent [19]

Kozak

[11] Patent Number: 4,817,929

[45] Date of Patent: Apr. 4, 1989

[54] CABLE CLAMP ALIGNMENT FIXTURE

[75] Inventor: Frank J. Kozak, St. Clair, Mich.

[73] Assignee: Detroit Edison Company, Detroit, Mich.

[21] Appl. No.: 138,580

[22] Filed: Dec. 28, 1987

[51] Int. Cl.⁴ .............................................. B25B 1/20
[52] U.S. Cl. ...................................... 269/43; 269/128
[58] Field of Search .................. 29/281.1, 281.5, 283; 269/126–129, 903, 41, 43, 269, 270, 239, 1, 3

[56] References Cited

U.S. PATENT DOCUMENTS

| | | | |
|---|---|---|---|
| 820,334 | 5/1906 | Backstrom | 269/128 |
| 1,824,387 | 9/1931 | Becker | 269/128 |
| 1,847,473 | 3/1932 | De Right | 269/128 |
| 2,211,242 | 8/1940 | McIntosh | 269/128 |
| 2,508,912 | 5/1950 | Ginns | 269/128 |
| 2,630,327 | 3/1953 | Landauer | 269/126 |
| 4,700,935 | 10/1987 | Winslow et al. | 269/126 |

Primary Examiner—Robert C. Watson
Attorney, Agent, or Firm—Barnes, Kisselle, Raisch, Choate, Whittemore & Hulbert

[57] ABSTRACT

A fixture for assisting in clamping the folded-back end portion of a cable to the load supporting main portion of the cable by clamps spaced apart lengthwise of the cable portions. Two elongated members of the fixture are pivoted together at one end for movement from an open position to a closed position. The members have confronting surfaces which in the closed position retain the cable portions in side-by-side relation when disposed lengthwise between the members. The confronting surfaces of the members have opposed recesses which in the closed position firmly grip the clamps so that the clamps may be tightened by means of a wrench or similar tightening device.

4 Claims, 2 Drawing Sheets

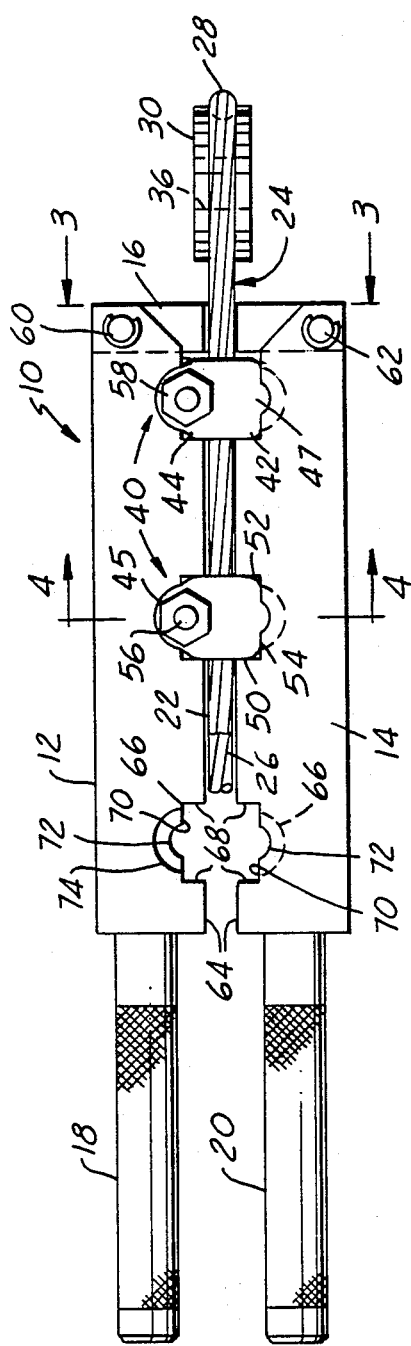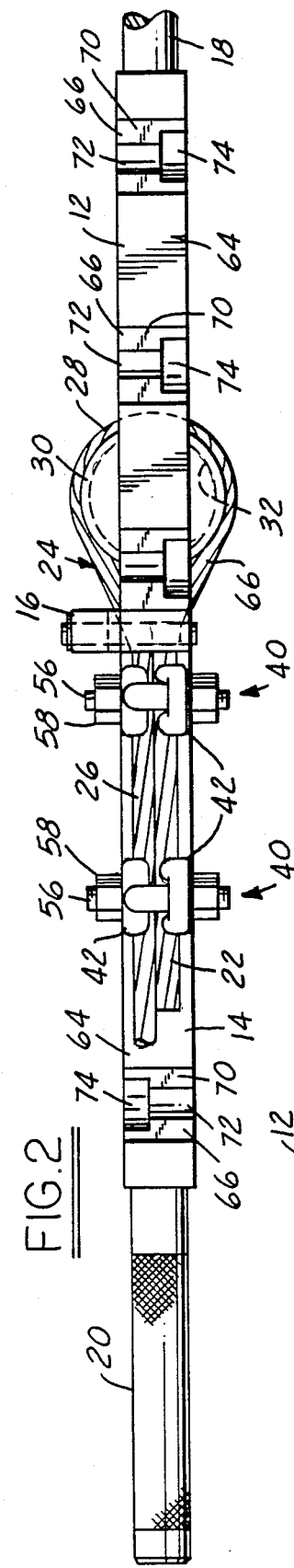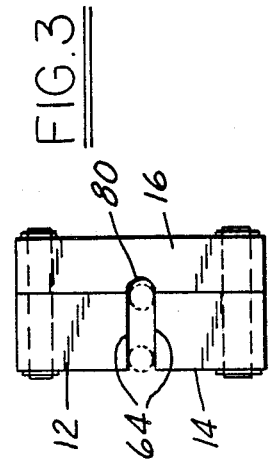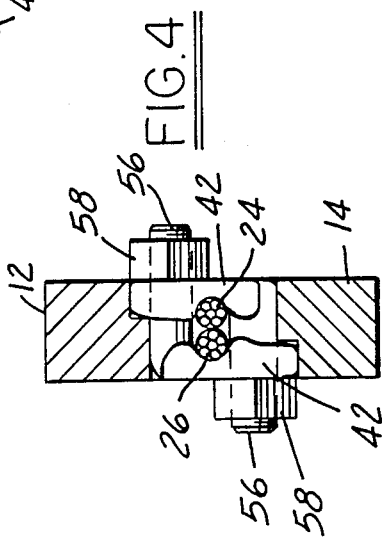

CABLE CLAMP ALIGNMENT FIXTURE

This invention relates generally to fixtures and refers more particularly to a fixture for assisting in clamping the folded-back end portion of a cable to the load supporting main portion thereof.

BACKGROUND AND SUMMARY OF THE INVENTION

Cables, in particular wire rope cables, are extremely strong in tension and are often used to support heavy loads. Such cables are employed to support vertically moveable platforms which are used to support workers engaged in maintenance and/or repair procedures on the sides of buildings and similar structures, for example.

In applications where a cable or wire rope is used to support heavy loads, the end portion of the cable is often folded back over a coupling member, and then the folded-back portion of the cable is clamped to the load supporting main cable portion by means of two or more clamps.

In clamping the folded-back end portion to the load supporting main portion of the cable, the clamps should be positioned properly, preferably in uniformly spaced relation along the length of the cable, the two cable parts should be maintained in a proper side-by-side relation, and then the clamps should be tightened sufficiently under uniform torque to support the load so that the load is equally distributed among the several clamps.

This is an extremely difficult operation particularly in the field, when done manually without the aid of a suitable means for maintaining the cables in proper position and for holding the clamps while they are being torqued.

The fixture of the present invention has been designed as a means of assisting in the application and tightening of clamps. Both a portable and a fixed bench-type model of the invention are disclosed.

In accordance with the invention, the fixture comprises first and second elongated members pivotally connected together at one end for movement from an open position to a closed position. The fixture members have confronting surfaces which in the closed position are disposed in such spaced apart relation to each other as to receive and retain the folded-back end portion and the main portion of the cable in side-by-side relation when the cable is laid lengthwise between the members. The members have a plurality of longitudinally spaced recesses in their confronting surfaces, the recesses in one member respectively being opposed to the recesses in the other member when the members are moved to closed position.

Then with the fixture open and the cable disposed lengthwise along one of the members with the loosened clamps positioned to fit into the recesses, the other member is closed upon the first member so that the clamps fit into the recesses in positions such that they are exposed and may be tightened by means of a wrench or similar tightening device. During this tightening of the clamps, the cable portions are held securely in side-by-side relation and the clamps are supported in the recesses in proper position for tightening.

By the use of this invention, it is assured that the clamps will be tightened upon the cable in uniformly spaced relation and if torqued to the same degree will securely clamp the cable parts together and distribute the load among the two or more clamps equally.

These and other objects of the invention will become more apparent as the following description proceeds, especially when considered with the accompanying drawings.

IN THE DRAWINGS

FIG. 1 is a side elevational view of a fixture constructed according to this invention, shown in the closed position, a cable with clamps applied extending lengthwise between the members of the fixture.

FIG. 2 is a top plan view of the fixture in open position, showing the cable with clamps applied lying loosely upon one of the fixture members with the clamps arranged in register with the recesses of the fixture member.

FIG. 3 is an end view taken on the line 3—3 in FIG. 1.

FIG. 4 is a sectional view taken on the line 4—4 in FIG. 1.

DETAILED DESCRIPTION

Figure 5:
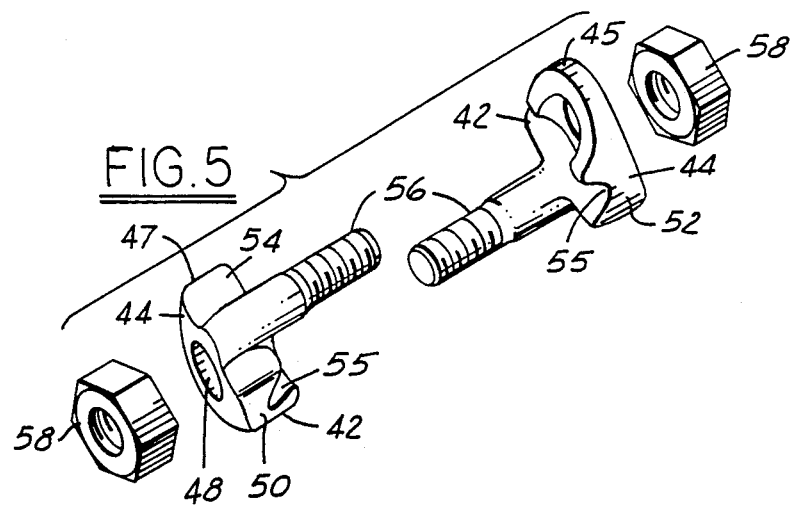
FIG. 5 is a perspective view showing the parts of a clamp separated.
Figure 6:
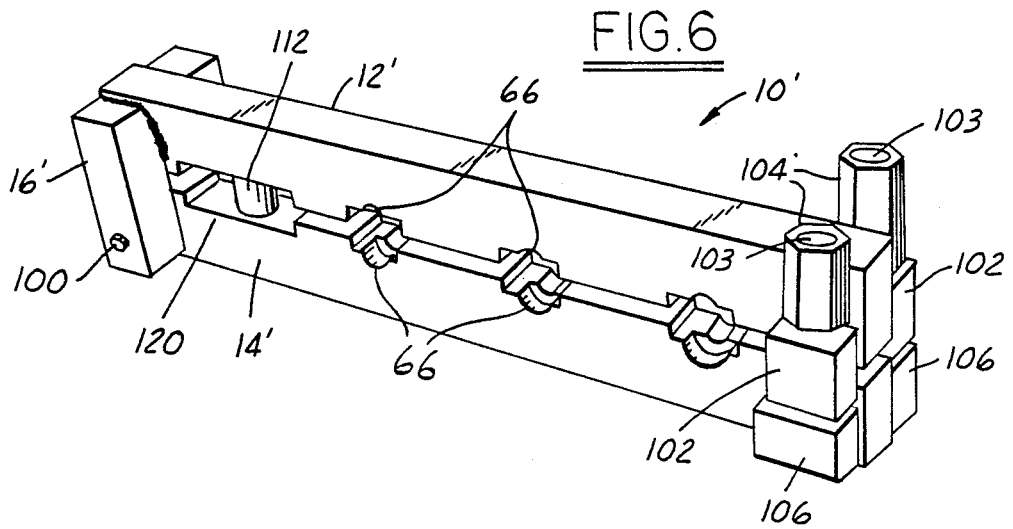
FIG. 6 is a perspective view showing a bench type fixture of modified construction.

Referring now more particularly to the drawings and especially to FIGS. 1-5 thereof, the numeral 10 refers to a fixture having a pair of elongated fixture members 12 and 14 pivoted together at one end by a pivot block 16. Handles 18 and 20 project from the opposite ends of the members 12 and 14.

The fixture of this invention is intended to assist in clamping the folded-back end portion 22 of a cable 24 to the load-supporting main portion 26 thereof. The folded-back end portion 22 is connected to the main portion 26 by a fold 28 which extends around a support member 30. Support member 30 is in the form of a wheel or ring which has a peripheral groove 32 in which the fold 28 of the cable is received, and a central hole 36 for receiving a coupling part (not shown) to which the cable may be attached. Preferably, the support member 30 is of electrically insulating material.

Distributed along the cable are a plurality of clamps 40 which are for the purpose of securely clamping the foldedback end portion 22 of the cable to the load supporting main portion 26 thereof.

The clamps 40 are of identical construction and each includes a pair of clamping parts 42. Each clamping part has a plate 44 one end portion 45 of which has a semicircular periphery and a central hole 48. The other end portion 47 of the plate 44 has a non-circular or generally rectangular periphery including side edges 50 and 52 and an end edge 54, with an integral stud 56 extending inwardly from the plate at right angles thereto and disposed slightly beyond the end edge 54 to provide a semi-circular bulge at the center of the end edge 54 when viewed from the outer side.

The inner face of the plate has a semi-circular recess 55 extending from one side edge 50 to the other side edge 52 which is of a diameter corresponding to that of the cable 24.

The clamping parts are assembled by reversing one of them end-for-end relative to the other, and causing the stud 56 of each to enter and extend through the hole 48 in the other. These studs are threaded on the ends and the clamp is tightened by the application of nuts 58 on the projecting threaded ends of the studs to draw the clamping parts together. When the clamping parts are assembled, the semi-circular recesses 55 are opposed to one another to receive and securely clamp the outer sides of the two cable parts 22 and 26.

Referring again to the fixture, the elongated members 12 and 14 of the fixture are pivoted to the pivot block 16. A pivot pin 60 connects one end of the elongated member 12 to one end of the pivot block, and a second pin 62 pivotally connects one end of the elongated member 14 to the opposite end of the pivot block. The two elongated members occupy the same plane and are supported for pivotal movement in that plane from an open position in which they are turned away from one another through an angle of 90° or more to a closed position in which the two members extend generally parallel to one another but in spaced apart relation. Actually, the elongated members can be moved into contacting relation, but with a cable positioned between the members, the members when closed on the cable are generally parallel.

The elongated members are identical. When in the closed position of FIG. 1, the flat confronting surfaces 64 are generally parallel to one another. Each confronting surface has three equally spaced identical recesses 66.

Each recess 66 has longitudinally spaced side walls 68 and a bottom wall 70. The side walls 68 are disposed at right angles to the surface 64 and to the length of the members 12 and 14. The bottom wall 70 is parallel to the surface 64 and has a central transverse semi-cylindrical groove 72. The configuration of the side walls 68 and grooved bottom wall 70 of recesses 64 corresponds to the non-circular configuration of one end portion 47 of the clamp plates 44 so that said one end portion of a clamp plate can fit into a recess 66 as illustrated, with its side edges 50 and 52 opposed to the side walls 68 of the recess, its end edge 54 opposed to the bottom wall 70 of the recess, and a portion of its stud 56 disposed in the semi-cylindrical groove 72. A clamp part thus fitted within the recess 66 is prevented from rotating.

Each recess 66 also has in the bottom wall 70 at one side thereof a semi-cylindrical pocket 74 for receiving the semi-circular end portion 45 of the plate 44 of a clamp part 42.

The recesses in one member 12 are reversed with respect to the recesses in the other member 14 as can be clearly seen in FIG. 2. When the fixture is closed, the recesses in the member 12 are respectively opposed to the recesses in member 14.

The side of the pivot block 16 adjacent to the elongated members has a semi-cylindrical recess 80 to provide clearance for a portion of the cable when the cable is positioned lengthwise between the elongated members 12 and 14 and the fixture is closed.

When it is desired to tighten the clamps 40 to secure the folded-back end portion 22 of the cable to the load-supporting main portion 26 thereof, the clamps 40, all similarly oriented, are loosely applied to those portions of the cable. The cable, including the insulator or support member 30, is laid upon one of the elongated members in the open position of the fixture and the clamps, in loosened condition, are slid lengthwise along the cable into register with the respective recesses 66. Then the fixture is closed by swinging the elongated members to the FIG. 1 position. The semi-circular portion 45 of one clamp part 44 of each clamp fits in the pocket 74 of a recess in one elongated member and the non-circular portion 47 of the same clamp part fits in the non-circular portion of a recess in the other elongated member defined by surfaces 68 and 70. Also, the non-circular portion of one clamp part of each clamp fits in the non-circular portion of a recess in one elongated member, and the non-circular portion of the other clamp part fits in the non-circular portion of a recess in the other elongated member. Therefore, each clamp is prevented from rotating when the fixture is closed.

When the fixture is closed, the confronting surfaces 64 of the elongated members bear upon the cable portions so that the cable portions are retained in side-by-side position and cannot twist or turn over on one another. By manual handle pressure, the cable portions are tightly gripped between the confronting surfaces 64 of the elongated members. The three clamps are now held in the fixture recesses 66 and cannot rotate because of the non-rotatable fit between the rectangular or non-circular portions of the clamp parts fitting in the rectangular or non-circular portions of the recesses defined by walls 68 and 70 thereof.

The closed fixture clears and exposes the nuts 58, so that the nuts can now be tightened to secure the clamp parts together in positions tightly gripping the cable portions. The amount of torque applied to the nuts of the three clamps should be the same so that each of the three clamps will be capable of taking an equal load.

After the nuts 58 are tightened, the fixture is opened, the cable is removed and the folded-back portion 22 is tightly and securely clamped to the load-supporting portion 26 by the three clamps 40. Because of the equal spacing of the clamps and equal torquing of the clamp nuts, a practically fail safe securement can be achieved.

Figure 7:
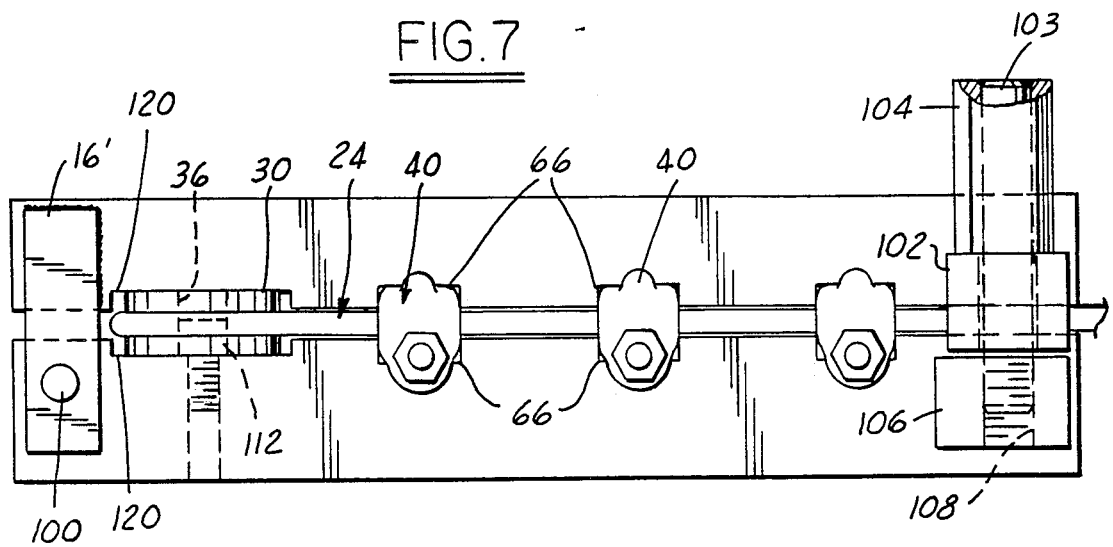
FIG. 7 is a side elevational view of the fixture of FIG. 6 showing the fixture members in closed position and a cable disposed lengthwise between the members.

FIG. 7 shows a modification of the invention in which the fixture 10' is of the fixed or bench type rather than portable.

The fixture 10' has elongated members 12' and 14' which are identical to the elongated members of the first embodiment and therefore have been identified by the same reference numerals primed.

The lower elongated fixture member 14' is secured to a fixed support such as a table. The other elongated member 12' has a pivot block 16' which in this instance is rigidly connection to one end thereof as by means of welding. The other end of the pivot block 16' is pivoted at 100 to one end of the bench mounted elongated member 14'.

On the swinging end of the elongated member 12', there are secured a pair of laterally spaced blocks 102 with bolts 103 extending through central bores in the two blocks. Bolts 103 have knobs 104. Similar blocks 106 are secured to the corresponding end of the other elongated member 14', the bores 108 in these blocks being threaded.

The bolts 103 carried by the swinging end of the member 12' are rotatable but prevented from dropping out of the bores of the blocks 102 by any suitable means not shown. In the closed position of the fixture 10', the bolts 103 thread into the bores of the blocks 106 on the elongated member 14' to releasably secure the fixture in closed position.

This bench model differs further from the portable model previously described, in that both members 12' and 14' are recessed at 120 to clear the insulator 30 when the fixture is closed and also, near the pivoted end of the fixed elongated member 14', there is an upstanding post 112 in recess 120 of member 14' for receiving the hole in the insulator 30 in the folded portion of the cable to locate the cable in proper position.

I claim:

1. A fixture for assisting in clamping the folded-back end portion of a cable to the load supporting main position of the cable by means of clamps spaced apart lengthwise thereof, said fixture comprising a first elongated member, a second elongated member, means pivotally connecting said members together at one end thereof for pivotal movement in a common plane from an open position to a closed position, said members having confronting surfaces which in the closed position of said members are disposed in parallel spaced apart relation to receive and retain said folded-back end portion and main portion of said cable in side by side relation when said cable is disposed lengthwise between said members, said first member having longitudinally spaced recesses in its confronting surface, said second member having longitudinally spaced recesses in its confronting surface which are respectively opposed to the recesses in the confronting surface of said first member when said members are moved to closed position, said opposed recesses in the closed position of said members receiving and firmly gripping said clamps against rotation and at the same time exposing said clamps so that they may be tightened by means of a wrench or similar tightening device.

2. A fixture as defined in claim 1, wherein said confronting surfaces of said members in areas other than where recessed, are substantially flat and parallel to one another when said members are in the closed position thereof to bear upon and clamp said cable portions in side by side relation.

3. A fixture as defined in claim 2, wherein each clamp has complementary clamping parts each having a portion of non-circular cross-section, the recesses in the confronting surface of one of said members having a portion of non-circular cross-section adapted to receive the non-circular portion of one of the clamping parts to prevent rotation thereof and another portion shaped to clear said other clamping part, and the recesses in the confronting surface of the other of said members having a portion of non-circular cross-section adapted to receive the non-circular portion of the other of said clamping parts to prevent rotation thereof and another portion shaped to clear said one clamping part.

4. A fixture as defined in claim 3, wherein said folded-back end portion of said cable is connected to said main portion thereof by a fold portion which extends around an annular support member, said first and second elongated members have recesses to clear said support member in the closed position of said elongated members, and one of said elongated members has a locating post in the recess thereof for engaging in the hole in said annular support member.

* * * * *